United States Patent [19]

Takano

[11] Patent Number: 4,580,456

[45] Date of Patent: Apr. 8, 1986

[54] BALANCE WEIGHT TRANSFER DEVICE FOR A VIBRATOR

[76] Inventor: Kikumithus Takano, 53-3, Oshiage 3-chome, Sumida-ku, Tokyo, Japan, 131

[21] Appl. No.: 597,826

[22] Filed: Apr. 6, 1984

[30] Foreign Application Priority Data

Apr. 14, 1983 [JP] Japan ............................ 58-55964[U]
Apr. 14, 1983 [JP] Japan ............................ 58-55963[U]

[51] Int. Cl.[4] ......................... B06B 1/16; F16H 33/10
[52] U.S. Cl. ......................................... 74/87; 366/128
[58] Field of Search ................... 74/61, 87; 209/366.5, 209/367; 366/128; 404/117

[56] References Cited

U.S. PATENT DOCUMENTS

| | | | |
|---|---|---|---|
| 948,047 | 2/1910 | Fraser | 74/87 |
| 1,207,847 | 12/1916 | Brantingham | 74/87 |
| 2,160,051 | 5/1939 | Ainsworth | 192/103 C |
| 2,839,937 | 6/1958 | Calfee | 74/87 X |
| 2,989,869 | 6/1961 | Hanggi | 74/87 X |
| 3,606,796 | 9/1971 | Pappers | 404/117 X |
| 3,822,604 | 7/1974 | Grimmer | 74/87 |
| 4,367,054 | 1/1983 | Salani et al. | 74/61 X |

FOREIGN PATENT DOCUMENTS 21013 of 1912 United Kingdom ............ 209/366.5

*Primary Examiner*—Allan D. Herrmann
*Attorney, Agent, or Firm*—Cushman, Darby & Cushman

[57] ABSTRACT

On the rotary output shaft of a variable-speed electric motor, there is fixed a sector-shaped weight. On the weight body, diametrically opposite its principal mass there is provided a radial projection provided with a radially extending cavity in which there is slidingly received at the radially inner end a weight. A plunger is pressed by a spring against the slidable weight and projects radially outwardly of the cavity. As the motor output shaft rotates more quickly, the slidable weight slides radially outwards, resiliently compressing the spring and extending the plunger. As the motor output shaft is slowed in rotation speed, the spring recovers, withdrawing the plunger and pushing the sliding weight back towards the shaft. In an elaboration, the plunger is provided outside the cavity with a device for adjustably pre-compressing the spring by pulling out the plunger by a variable amount.

7 Claims, 9 Drawing Figures

BALANCE WEIGHT TRANSFER DEVICE FOR A VIBRATOR

FIELD OF THE INVENTION

This invention relates to balance weight transfer device for a vibrator, and more particularly a weight for a vibrator of which the vibration speed is freely changed within a given range.

BACKGROUND OF THE INVENTION

In the field of construction of buildings and the like, a vibrator or vibrators are used for providing certain vibrations into wet concrete, cement and the like. In this case, the vibration speed (v.p.m.) of the vibrator is selected according to the kinds of the cement or slab structures. For example, vibration speeds of 1,500 v.p.m., and 9,000 v.p.m., are provided for rough particle structures and finely divided particle made structures, respectively. Provision of such vibration causes air gaps in the interior of the concrete, cement and the like to be eliminated and causes an increase of strength of the concrete. A fine aesthetic finish is achieved.

Conventional, known vibrators for such use employ a weight of a given weight on a rotary shaft of a motor and the motor is arranged to be rotated in a given direction, such vibrators have a given vibration speed, centrifugal force and vibration bandwidth. When the vibration speed is intended to be changed because the particle sizes of the structure materials are different, different vibrators conventionally have been needed, and such a requirement has proven quite uneconomic.

SUMMARY OF THE INVENTION

To overcome said conventional defects, a primary object of this invention is to provide a balance weight for a vibrator to permit a selection of variable vibration speed according to the object materials to be vibrated. This invention provides such a weight transfer device for vibrators comprising a motor with varible speed rotation having an output shaft, a balance weight of generally sectorial shape of which a major portion is securely mounted on the output shaft, a projection having a hollow chamber therein extending beyond said output shaft and on a radial line of said weight, a further weight, e.g. in the form of a rigid iron steel ball slidably and rotatably received in the chamber at a position close to said output shaft, a slidable plunger of which one end is slidably mated in said hollow chamber and of which another end is slidably received through an opening of the radially outer tip end of said projection outwardly from said projection, and a spring giving a transfer characteristic performance to said slidable plunger toward said ball. As a modification, the slidable plunger is provided at its outermost end with nuts which are threadedly mounted so as to have adjustable positions.

BRIEF DESCRIPTION OF THE ACCOMPANYING DRAWINGS

Figure 1:
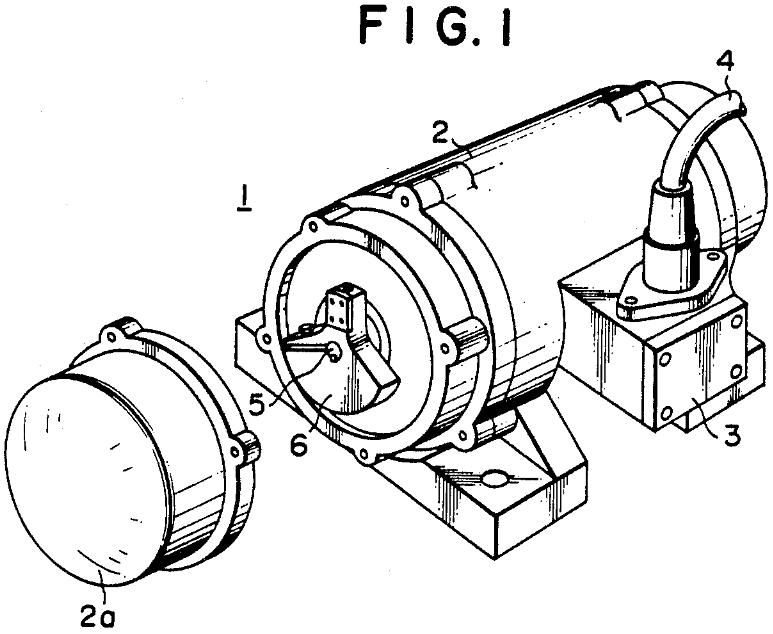
FIG. 1 is a perspective view of a embodying principles of this invention.

The vibrator 1 is shown including an electric motor 2, of which a side face has a terminal box 3 through which an electric power supply cord 4 is connected. A cover **2*a*** is also is provided for the rotary power output shaft end of the motor.

Provided on the output shaft 5 of the motor 2 is the balance weight 6 which is generally sectorial and made of steel or the like. A slit **6*b* is formed to reach a mating circular opening 6*a* for the output shaft 5 near either the left or right (clockwise-most or counterclockwise-most) end of the weight 6. For said slit 6*b*, a resilient piece 7 is formed. The weight 6 is tightly squeezed onto the output shaft 5 by inserting a bolt 8 from the outside of the resilient piece 7 toward the weight body 6. A key 9 is inserted between the weight 6 and the output shaft 5 for preventing a slip. Two weight change bolts 10,10 are shown detachably provided on a side face of the weight 6. These bolts 10,10 are for meeting a requirment for territories where either one of 50 or 60 hertz is employed and changing the weights adjusts for the change in the revolution speed of the motor 2** caused by the change of frequency of the power source.

Figure 2:
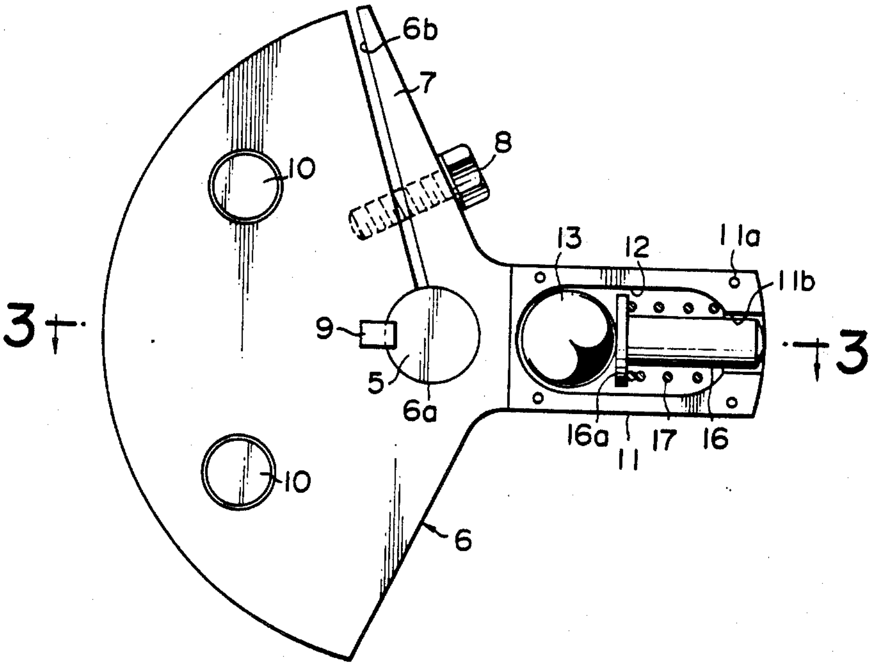
FIG. 2 is a front view of the weight transfer device.
Figure 3:
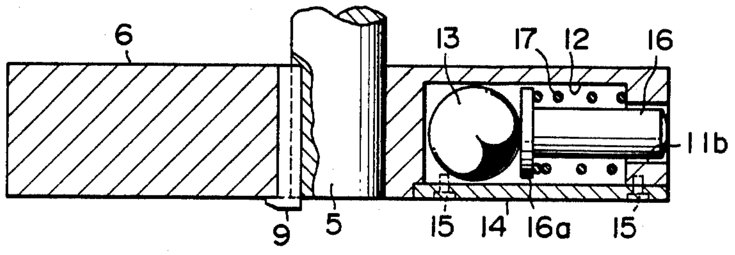
FIG. 3 is a cross sectional view of the FIG. 2 along line 3—3.
Figure 4:
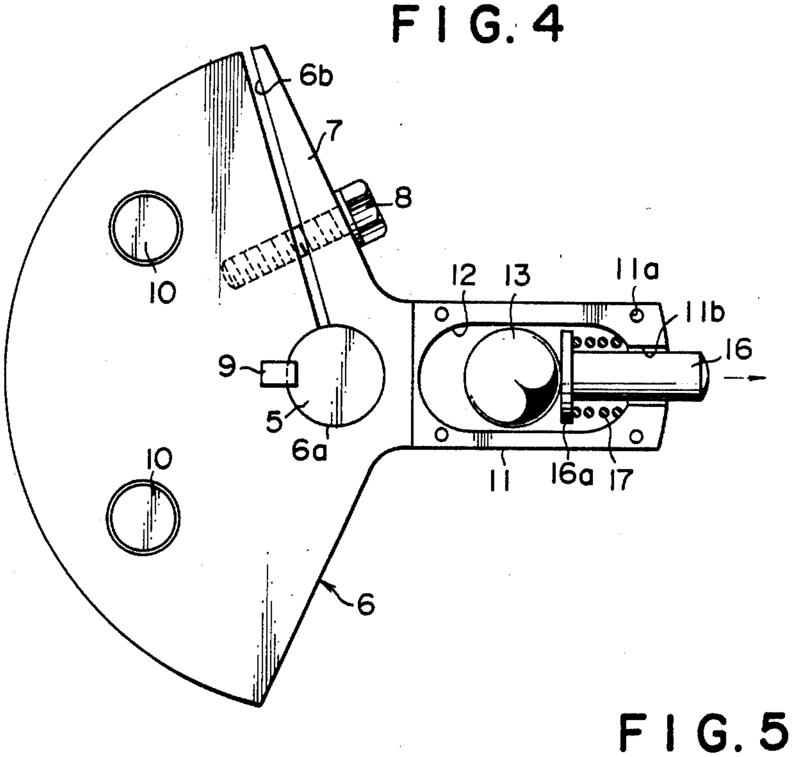
FIG. 4 is a operational state frontal view.
Figure 5:
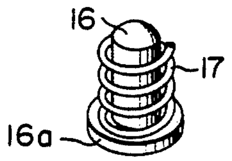
FIG. 5 is a perspective view of the slidable plunger.
Figure 6:
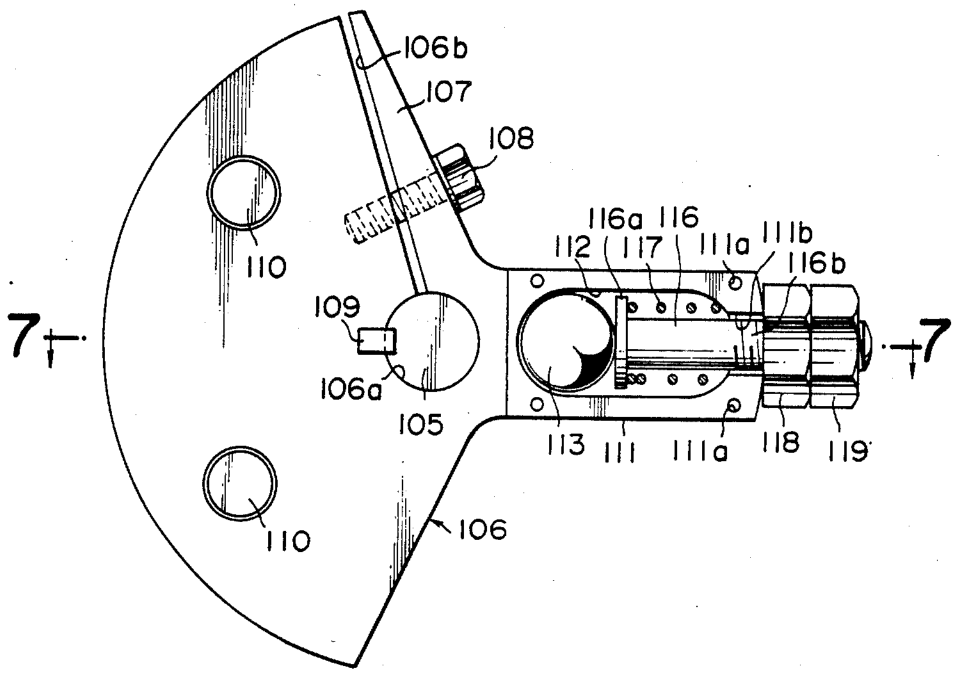
FIG. 6 is a perspective view of the weight transfer device of a modification.
Figure 7:
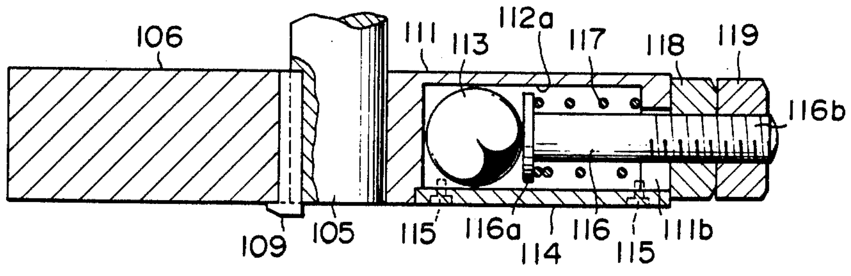
FIG. 7 is a cross sectional view of FIG. 6 along line 7—7.
Figure 8:
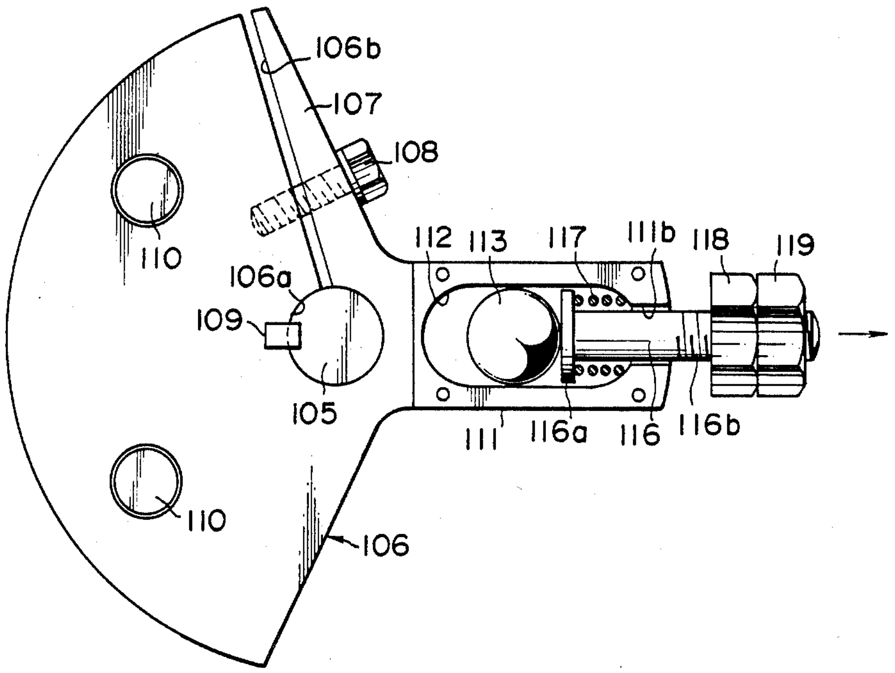
FIG. 8 is a operational state view of the modification.
Figure 9:
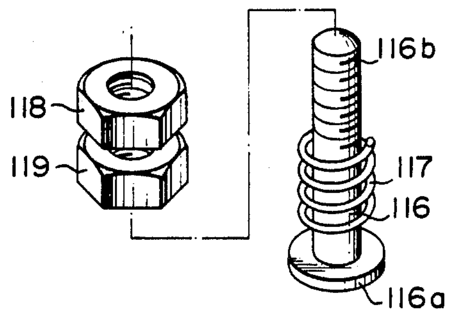
FIG. 9 is a perspective view of the slidable plunger and the nuts.

Protrudedly provided on a radial line of the weight 6 is a projection 11, of which base portion fixedly receiving said output shaft 5. The hollow chamber formed in the projection 11 receives rotatably the weight e.g. in the form of a steel ball 13 close to the output shaft 5. A cavity or chamber 12 which is provided has an opening at its radially outer end as clearly shown in FIGS. 2 and 3 and said opening is closed on one side by fixing a closing plate 14 with a screw 15. A screw hole **11*a*** is also shown.

Formed at an outer end of the projection 11 is a slit **11*b* through which a slidable shaft or plunger 16 is slidably received. The slidable shaft 16 is at one end is inserted into the chamber 12 and a disk 16*a* which is normally circular is fixed on the radially inner end of the shaft 16. Mounted in compression between the disk 16*a* and the slit 11*b* side within the chamber 12 is a spring 17, which always presses the slidable shaft 16 toward the steel ball 13**.

An invertor is provided at the power supply side, although not shown, to adjust and control the frequency of the current to be supplied to the motor and it freely changes the frequency within a given range for supplying the motor 2, as requested.

Now, an operation of the device as discussed above will be discussed in detail. When electrical power is not supplied to the motor 2, the slidable shaft 16 presses the steel ball 13 with an aid of stored or repelling energy of the spring 17, through the disk **16*a* and further presses it against the end of the chamber 12 which is nearest the output shaft 5. When electrical power is supplied to the motor 2, at the given frequency, the motor 2 is driven at a given revolution speed. In response to said revolution speed, centrifugal force is created and in response to said centrifugal force, the ball 13 moves radially away from the output shaft in the chamber 12. As a result, the slidable shaft 16 is outwardly pushed out, compressing the spring 17. This moving or transfering amount is in response to the centrifugal force amount. This transferring amount of the slidable shaft is not only caused by said transfer of the ball 13, but also by a centrifugal force acting on the weight of the slidable shaft 16 itself. As a result, the inertia moment of the weight 6 itself changes and then the vibration speed of the vibrator is determined. Thus, if the frequency of the current to the motor 2** is changed, the frequency of the vibrator is correspondingly changed.

Now, referring to FIGS. 6–9 a modification will be hereinafter discussed as to its different features. The like members are designated by like numerals, raised by 100, and the functions are almost similar unless specifically otherwise specified herein. An outer end of a slidable shaft 116 passes out through a slit 111*b*, and threads 116*b* are provided around the emergent portion of the shaft. Threadedly mounted on said shaft by the threads 116*b* are two nuts 118, 119. Threaded adjustment of the nuts 118,119 causes the spring 117 to be more compressed or more released, so that the pressing energy of the slidable shaft 116 against a steel ball 113 is adjusted. In addition to the first embodiment, due to the existence of the nuts, 118,119 the weight changes to a great extent, and hence, the intertia moment changes more greatly, and thus the vibration adjustability is greatly enhanced.

I claim:

1. A variable-frequency balance weight for securement on the rotary output shaft of a variable-speed motor, said balance weight comprising:

a weight body including a hub portion constructed and arranged to be fixed on the rotary output shaft of the motor and a weight portion projecting generally radially outwards from said hub;

said weight body further including:

means providing an at least generally radially extending chamber;

a further weight means slidingly received in said chamber adjacent a radially outer end of said chamber; and spring means acting in compression between said further weight means and a radially outer end of said chamber for tending to urge said further weight means radially inwardly in opposition to centrifugal force, said spring means having such a magnitude of spring constant that in normal operation said spring may become at least partially compressed and said further weight means may travel radially outwards to a respective extent, thus modifying the moment of inertia of the balance weight;

adjustable means acting between said weight body and said further weight means for selectively pre-compressing said spring means to a desired extent;

said adjustable means being constructed and arranged to correspondingly shift at least part of said further weight means radially outwardly as said spring means is selectively precompressed to a desired extent.

2. The balance weight of claim 1, wherein:

said weight portion of said weight body is sector-shaped.

3. The balance weight of claim 2, wherein:

said weight body is provided with at least one removable plug for varying the effective mass of said weight body by at least one respective increment.

4. The balance weight of claim 2, wherein:

said chamber is provided in a radial enlargement of said weight body, which is provided on said hub diametrically opposite said weight portion.

5. The balance weight of claim 1, wherein:

said further weight means comprises a ball member abutted with a plunger member, said plunger member being provided with a collar against which a radially inner end of said spring means bears, said spring means being constituted by a compression coil spring.

6. The balance weight of claim 5, wherein:

said weight body further includes means defining a radially outwardly opening aperture from said chamber;

said plunger member of said further weight means extending partly out of said chamber through said aperture so as to have an emerging portion which is accessible externally of said weight body;

said adjustable means being constituted by at least one nut adjustably threadedly received on said plunger member emergent portion.

7. The balance weight of claim 6, wherein:

said chamber is provided in a radial enlargement of said weight body, which is provided on said hub diametrically opposite said weight portion.

* * * * *